United States Patent
DiMatteo et al.

(10) Patent No.: US 9,631,716 B2
(45) Date of Patent: Apr. 25, 2017

(54) PLUG FOR A PLANETARY PIN ASSEMBLY

(71) Applicant: Koyo Bearings North America LLC, Westlake, OH (US)

(72) Inventors: Giovanni DiMatteo, Fenton, MI (US); Dan Watson, Simpsonville, SC (US)

(73) Assignee: Koyo Bearings North America LLC, Westlake, OH (US)

( * ) Notice: Subject to any disclaimer, the term of this patent is extended or adjusted under 35 U.S.C. 154(b) by 0 days.

(21) Appl. No.: 14/415,240

(22) PCT Filed: Jul. 19, 2013

(86) PCT No.: PCT/US2013/051269
§ 371 (c)(1),
(2) Date: Jan. 16, 2015

(87) PCT Pub. No.: WO2014/015253
PCT Pub. Date: Jan. 23, 2014

(65) Prior Publication Data
US 2015/0184737 A1    Jul. 2, 2015

Related U.S. Application Data

(60) Provisional application No. 61/673,379, filed on Jul. 19, 2012.

(51) Int. Cl.
*F16H 57/04*    (2010.01)
*F16B 21/06*    (2006.01)
(Continued)

(52) U.S. Cl.
CPC ........ *F16H 57/0479* (2013.01); *F16H 57/043* (2013.01); *F16B 13/02* (2013.01);
(Continued)

(58) Field of Classification Search
CPC ........ F16B 21/08; F16B 21/06; F16B 21/086; F16B 21/09; F16B 13/02; F16B 13/002;
(Continued)

(56) References Cited

U.S. PATENT DOCUMENTS 2,408,336 A * 9/1946 Orr .................... F16H 57/0479
184/6.12
5,151,104 A * 9/1992 Kenna .................. A61F 2/0811
606/328
(Continued)

FOREIGN PATENT DOCUMENTS

CN    102338211 A    2/2012
JP    H02163556 A    6/1990
(Continued)

OTHER PUBLICATIONS

The International Search Report and the Written Opinion for PCT/US2013/051269 dated Oct. 1, 2013.
(Continued)

*Primary Examiner* — Justin Holmes
*Assistant Examiner* — David Morris
(74) *Attorney, Agent, or Firm* — Nelson Mullins Riley & Scarborough, LLP

(57) ABSTRACT

A pin assembly for use in a planetary gear, including a pin defining a blind bore therein, the blind bore extending axially from an opening and terminating with an end face, the pin defining an inlet bore and an outlet bore, and a plug including a substantially cylindrical body including a circular base wall and a sidewall extending from its outer perimeter, the sidewall defining an inlet recess and an outlet recess. The inlet recess and outlet recess of the plug are aligned with the inlet bore and outlet bore, respectively, of the pin when the plug is inserted in the pin.

13 Claims, 1 Drawing Sheet

(51) Int. Cl.
   *F16B 21/08* (2006.01)
   *F16B 13/02* (2006.01)
   *F16B 13/04* (2006.01)

(52) U.S. Cl.
   CPC ............... *F16B 13/04* (2013.01); *F16B 21/06* (2013.01); *F16B 21/08* (2013.01); *F16B 21/086* (2013.01)

(58) Field of Classification Search
   CPC ........ F16B 13/04; F16B 13/001; F16H 57/04; F16H 57/043; F16H 57/0479
   See application file for complete search history.

(56) References Cited

U.S. PATENT DOCUMENTS

| | | | | |
|---|---|---|---|---|
| 6,691,837 | B1* | 2/2004 | Kapaan | F16D 65/18 188/156 |
| 7,967,713 | B2 | 6/2011 | Haupt et al. | |
| 8,425,361 | B1* | 4/2013 | Beckner | F16H 57/04 475/159 |
| 2007/0082778 | A1* | 4/2007 | Yamamura | F16D 25/0638 475/317 |
| 2012/0015749 | A1* | 1/2012 | Gooden | F16H 57/043 464/7 |
| 2015/0330498 | A1* | 11/2015 | Carlino | F16H 57/0479 475/159 |

FOREIGN PATENT DOCUMENTS

| | | |
|---|---|---|
| JP | H0564560 U | 8/1993 |
| JP | H0814369 A | 1/1996 |
| JP | 2004108451 A | 4/2004 |
| JP | 2005321026 A | 11/2005 |
| JP | 2009192072 A | 8/2009 |
| WO | 2009100202 A1 | 8/2009 |

OTHER PUBLICATIONS

Office Action dated Dec. 15, 2015 for Japanese Application No. 2015-523283.
Office Action dated Feb. 5, 2016, for Korean Patent Application No. 10-2015-7000887.
First Office Action for Chinese Application No. 201380035792.X dated Jul. 26, 2016.

* cited by examiner

PLUG FOR A PLANETARY PIN ASSEMBLY

FIELD OF THE INVENTION

The present disclosure relates generally to planetary bearings. More particularly, the present disclosure is related to a plug for enhancing lubrication flow through a pin of a planetary bearing.

BACKGROUND

A typical concern with planetary bearings in transmissions is sufficient lubrication flow to the rolling elements of the planetary bearing. Lube dams on carriers, hollow pins, semi-hollow pins, cross drilled pins, ball/drawn plug pins, etc., are devices and methods that direct lubrication to the planetary bearing. Each of these designs has its own concerns, which can include high cost, additional customer assembly, pin deformation from pressed ball or drawn steel plug, risk of pressed plugs falling out, and debris/burrs from multiple complex machining operations that require special considerations (i.e., deburring and washing operations).

The present invention recognizes and addresses considerations of prior art constructions and methods.

SUMMARY

One embodiment in accordance with the present disclosure is a pin assembly for use in a planetary gear, including a pin defining a blind bore therein, the blind bore extending axially from an opening and terminating with an end face, the pin defining an inlet bore and an outlet bore, and a plug including a substantially cylindrical body including a circular base wall and a sidewall extending from its outer perimeter, the sidewall defining an inlet recess and an outlet recess. The inlet recess and outlet recess of the plug are aligned with the inlet bore and outlet bore, respectively, of the pin when the plug is inserted in the pin.

Another embodiment in accordance with the present disclosure is a pin assembly for use in a planetary gear, including a pin defining a blind bore therein, the blind bore extending axially from an opening and terminating with an end face, the pin defining an inlet bore and an outlet bore, and a plug including a body with a base wall and a sidewall extending from its outer perimeter, the sidewall defining an inlet recess and an outlet recess. The inlet recess and outlet recess of the plug are aligned with the inlet bore and outlet bore, respectively, of the pin when the plug is inserted in the pin.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
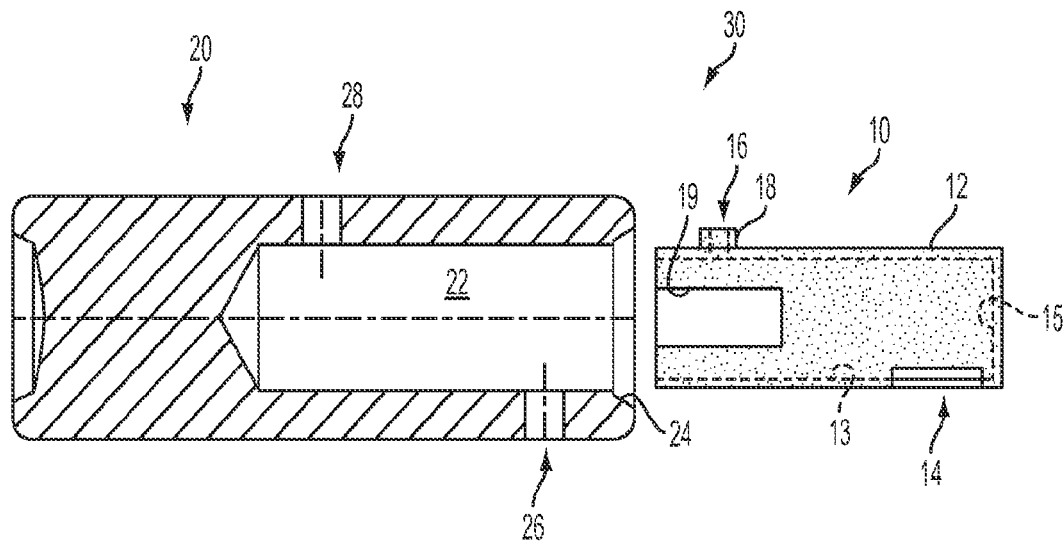
FIG. 1 is an exploded view of a planetary bearing pin and plug assembly in accordance with an embodiment of the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
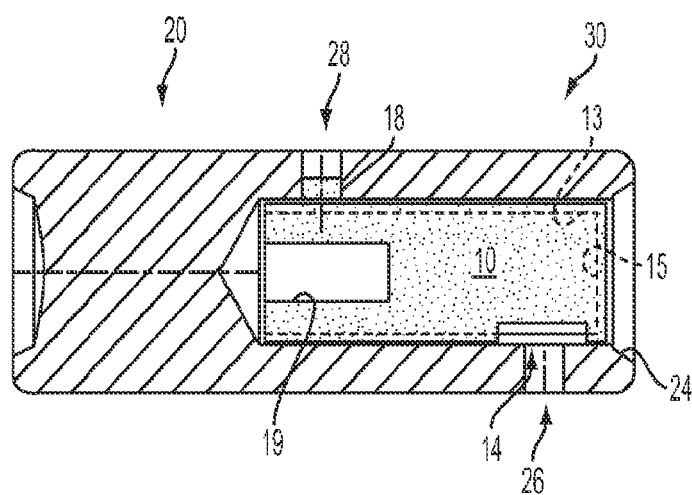
FIG. 2 is a cross-sectional view of the planetary bearing pin and plug assembly, as shown in FIG. 1, in an assembled state.

Referring now to the figures, a planetary pin and plug assembly 30 in accordance with the present disclosure is shown in FIGS. 1 and 2. The assembly includes a plug 10 that enhances lubrication flow in a pin 20 of a planet bearing. As shown, pin 20 includes a blind bore 22 extending axially inward from an opening 24 formed in one of its ends. An inlet bore 26 and an outlet bore 28 extend radially inward from the outer surface of the pin to blind bore 22. Plug 10 includes a substantially cylindrical body 12 formed by a sidewall 13 and base wall 15, an inlet aperture 14, an outlet aperture 16 and a retention feature 18 defined by a cylindrical wall formed around outlet aperture 16. As well, a cut-out 19 is formed in the leading edge of plug 10, about its open end, which is inserted into blind bore 22 first when positioning plug 10 therein. Plug 10 is preferably constructed of a polymer material, but may be constructed of alternate materials that are found to be suitable for the intended purpose.

As shown in FIG. 2, plug 10 is slid inwardly into blind bore 22 until fully seated therein and inlet/outlet apertures 14 and 16 are aligned with inlet/outlet bores 26 and 28, respectively. In this position, retention feature 18 is resiliently received within outlet bore 28 to retain plug 10 within pin 20. Cutout 19 on the leading edge of plug 10 allows the leading edge to deform, thereby facilitating insertion. Plug 10 helps to enhance the flow of lubrication through pin 20 by directing the flow from inlet bore 26 to outlet bore 28.

Note, an alternate embodiment of a plug (not shown) for use in a planet bearing pin having a through bore includes a second base wall at the end of body 12 opposite first base wall 15. As such, body 12 forms a closed volume with the exception of inlet and outlet apertures 14 and 16.

While one or more preferred embodiments of the invention are described above, it should be appreciated by those skilled in the art that various modifications and variations can be made in the present invention without departing from the scope and spirit thereof. For example, alternate embodiments of plugs can include cutouts 19 having different configurations (i.e., triangular, semi-circular, etc.), wall portions that differ in thickness and shape from each other, and are constructed of various elastically deformable materials, etc. It is intended that the present invention cover such modifications and variations as come within the scope and spirit of the appended claims and their equivalents.

What is claimed:

1. A pin assembly for use in a planetary gear, comprising:
a pin defining a blind bore therein, the blind bore extending axially from an opening and terminating with an end face, the pin defining an inlet bore and an outlet bore that extend radially inward from an outer surface of the pin to the blind bore; and
a plug including a substantially cylindrical body including a circular base wall and a sidewall extending from its outer perimeter, the sidewall defining an inlet aperture and an outlet aperture,
wherein the inlet aperture and outlet aperture of the plug are aligned with the inlet bore and outlet bore, respectively, of the pin when the plug is inserted in the pin.

2. The pin assembly of claim 1, wherein the plug further comprises a retention feature that is configured to engage one of the inlet bore and the outlet bore of the pin so that the plug is retained in the pin.

3. The pin assembly of claim 2, wherein the retention feature is a projection.

4. The pin assembly of claim 3, wherein the projection is a cylindrical wall formed around one of the inlet aperture and the outlet aperture.

5. The pin assembly of claim 1, wherein the plug is constructed of a polymer.

6. The pin assembly of claim 1, wherein the plug further comprises an open end defined by a leading edge of the sidewall.

7. The pin assembly of claim 6, further comprising a cut-out defined by the leading edge adjacent the open end of the plug.

8. A pin assembly for use in a planetary gear, comprising:
a pin defining a blind bore therein, the blind bore extending axially from an opening and terminating with an end face, the pin defining an inlet bore and an outlet bore;
a plug including a body with a base wall and a sidewall extending from its outer perimeter, the sidewall defining an inlet aperture and an outlet aperture; and
a cylindrical wall formed around one of the inlet aperture and the outlet aperture, the cylindrical wall being configured to engage one of the inlet bore and the outlet bore of the pin so that the plug is retained in the pin,
wherein the inlet aperture and outlet aperture of the plug are aligned with the inlet bore and outlet bore, respectively, of the pin when the plug is inserted in the pin.

9. The pin assembly of claim 8, wherein the base wall has a circular perimeter and the sidewall forms a cylinder.

10. The pin assembly of claim 8, wherein the cylindrical wall extends radially outwardly from the pin.

11. The pin assembly of claim 8, wherein the plug is constructed of a polymer.

12. The pin assembly of claim 8, wherein the plug further comprises an open end defined by a leading edge of the sidewall.

13. The pin assembly of claim 12, further comprising a cut-out defined by the leading edge adjacent the open end of the plug.

* * * * *